United States Patent [19]

Schaefer

[11] 4,430,148
[45] Feb. 7, 1984

[54] ULTRASONIC BONDING APPARATUS

[75] Inventor: Jean E. Schaefer, Cincinnati, Ohio

[73] Assignee: The Procter & Gamble Company, Cincinnati, Ohio

[21] Appl. No.: 372,404

[22] Filed: Apr. 27, 1982

[51] Int. Cl.³ .............................................. B29C 27/08
[52] U.S. Cl. ................................ 156/580.2; 156/73.1; 156/553; 264/23; 425/174.2
[58] Field of Search .................... 156/73.1, 73.2, 62.2, 156/181, 290, 296, 580.1, 580.2, 553; 264/23; 425/174.2

[56] References Cited

U.S. PATENT DOCUMENTS

| | | | |
|---|---|---|---|
| 3,660,186 | 5/1972 | Sager et al. | 156/73.2 |
| 3,666,599 | 5/1972 | Obeda | 156/73.2 |
| 3,966,519 | 6/1976 | Mitchell et al. | 156/73.1 |
| 4,311,540 | 1/1982 | Hill | 156/580.1 |

Primary Examiner—Michael G. Wityshyn
Attorney, Agent, or Firm—Thomas J. Slone; Fredrick H. Braun; Richard C. Witte

[57] ABSTRACT

An improved ultrasonic bonding apparatus for pattern bonding juxtaposed laminae with a pattern of discrete bonds defined by a multiplicity of discrete pattern protuberances disposed on an anvil as the laminae are forwarded in the machine direction while fixedly associated with the discrete pattern protuberances. In such apparatus having the tip of an ultrasonic transducer biased towards its anvil surface, the discrete pattern protuberances are so configured and disposed on the anvil in its machine direction to obviate cobblestoning of the transducer with respect to the anvil as a patterned portion thereof is moved past the transducer tip; and/or the discrete pattern protuberances are so configured and disposed transverse the apparatus to precipitate wear—preferably even wear—of the tip of the ultrasonic transducer of the apparatus along the entirety of a line-of-contact portion thereof. The discrete pattern protuberances may be of various plan-view shapes including but not limited to geometrical or random shape areas, lines or closed linaments and/or combination thereof. The anvil is preferably a rotatably mounted and driven anvil cylinder.

7 Claims, 10 Drawing Figures

ULTRASONIC BONDING APPARATUS

DESCRIPTION

1. Technical Field

This invention pertains to apparatus for ultrasonically pattern bonding together webs—particularly thin webs—to form a laminate thereof which webs are, corporately, subject to being ultrasonically bonded together. Such webs include for example, fibrous non-wovens of such materials as polyesters, and polypropylene; thermoplastic films such as polyethylene; and elastomeric films comprising such materials as butadine/styrene copolymers. More particularly, this invention pertains to such apparatus wherein the bonding pattern is discontinuous, and wherein the ultrasonic bonding is effected on-the-fly: that is, while the webs are being forwarded in juxtaposed relation at a relatively high velocity.

2. Background Art

Prior ultrasonic bonding apparatuses include apparatuses for converting web or sheet materials into laminates on-the-fly with predetermined patterns of bonded regions. Such apparatuses having discontinuous patterns are disclosed, for example, in U.S. Pat. Nos. 3,733,238—Long et al; 3,879,256—Rust; 3,993,532—McDonald et al; 4,146,416—Goldman; and 4,311,540—Hill. Also, an ultrasonic laminating apparatus wherein the bonding pattern comprises a continuous line which closes on itself (i.e., a closed lineament) is disclosed in U.S. Pat. No. 3,562,041—Robertson.

While the background art discloses methods and apparatus which have been developed to overcome some of the problems of ultrasonically bonding webs to convert them into pattern bonded laminates, the discovered background art has not solved all of the problems associated with such web laminating in the manner of nor to the extent of the present invention. In particular, defining patterns of discrete bonding protuberances on an anvil so as to obviate cobblestoning of the tip of an ultrasonic transducer which is pressure biased towards the anvil; and/or so configuring patterns of anvil protuberances that wear of the tip is distributed across its entire active width. Indeed, so that such wear is preferably substantially evenly distributed across the entire active width of the tip so that the frequency of needing to redress the tip is substantially reduced.

DISCLOSURE OF THE INVENTION

In accordance with one aspect of the invention, an improved ultrasonic bonding apparatus is provided with a multiplicity of discrete pattern protuberances which are so configured and disposed in the machine direction that cobblestoning of the tip of an ultrasonic transducer biased theretowards is obviated; and/or which protuberances are so configured and disposed transverse the anvil that wear is induced on the entirety of a line-of-contact portion of the tip which also extends transverse the anvil. In preferred embodiments, the protuberances have a continuity of overlap in the machine direction, and induce substantially even wear across the entirety of the line-of-contact portion of the tip of the ultrasonic transducer. Also, the anvil is preferably a rotatably mounted and driven cylinder.

BRIEF DESCRIPTION OF THE DRAWINGS

While the specification concludes with claims particularly pointing out and distinctly claiming the subject matter regarded as forming the present invention, it is believed the invention will be better understood from the following description taken in conjuction with the accompanying drawings in which:

DETAILED DESCRIPTION OF THE INVENTION

Figure 1:
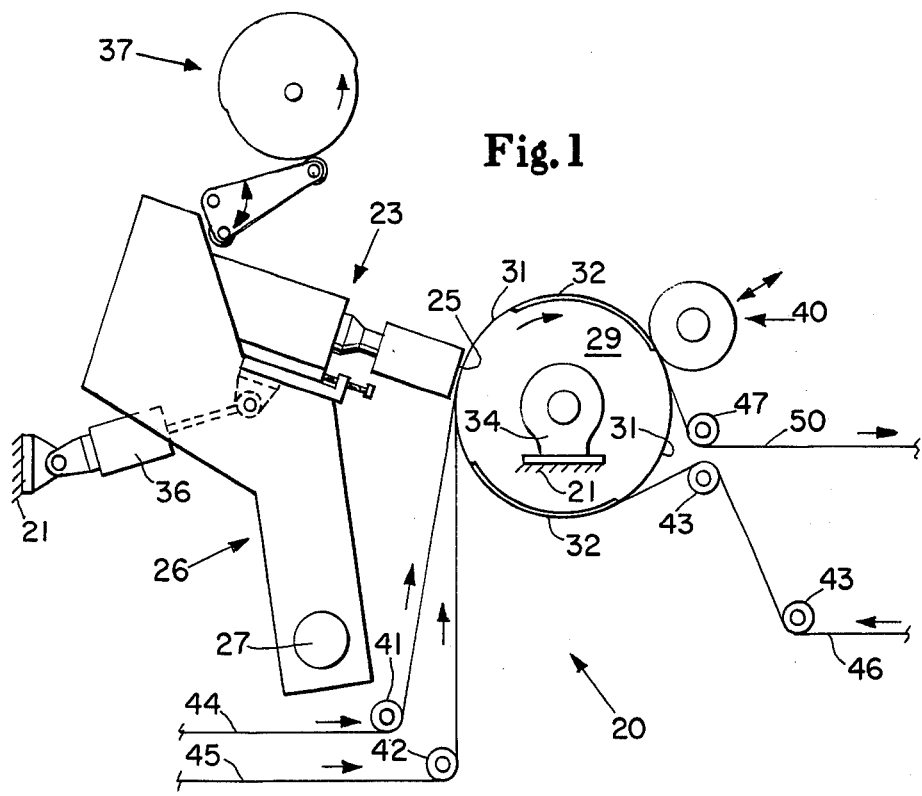
FIG. 1 is a somewhat schematic, side-elevational view of an ultrasonic laminating apparatus which embodies the present invention.

An exemplary web laminating apparatus 20 embodying the present invention is shown in FIG. 1 to include a frame 21 (only part of which is shown); an ultrasonic transducer 23 having a tip or contact surface 25; a pivotally mounted frame assembly 26 pivoted on bearing 27 and upon which the ultrasonic transducer 23 is adjustably mounted; a rotatably mounted anvil cylinder 29 having relief-type patterned sectors 31, and non-bonding-inducing sectors 32; anvil drive means 34; actuator means 36 for biasing the ultrasonic transducer 23 towards the anvil cylinder 29; camming means 37 for spacing the ultrasonic transducer 23 outwardly from the anvil cylinder 29 in timed relation with the rotation of anvil cylinder 29 so that the tip 25 of the ultrasonic transducer 23 does not contact the non-bond-inducing sectors 32 of the anvil cylinder 29; tension isolating means 40; guide rolls 41, 42 and 43 for guiding three laminae (i.e., webs 44, 45 and 46 respectively) onto the anvil cylinder 29; and guide roll 47 for guiding the laminated web 50 to downstream ancillary apparatus such as, for instance, reeling means not shown or a disposable diaper converting apparatus, also not shown. The apparatus may further include means for forwarding the infeeding webs under controlled tension, which means are well known to persons of ordinary skill in the art, and which means are accordingly not shown in FIG. 1.

Briefly, referring to the exemplary apparatus shown in FIG. 1 and as will be described more fully hereinafter, the present invention provides relief-type patterned sectors 31 on the anvil cylinder 29 which sectors comprise predetermined patterns of discrete pattern protuberances. The discrete protuberances are configured and disposed to obviate cobblestoning of the tip 25 thereagainst, and/or to distribute induced wear across the entire line-of-contact portion (i.e., the entire active width) of tip 25: indeed, preferably, to induce substantially even wear thereacross. The line-of-contact portion has a length which extends transverse the anvil surface and is equal to the overall width of the pattern of protuberances on the anivl. This dimension is designated LOC in FIG. 2.

As used herein, cobblestoning is the type of bumping motion which is induced as a pressure biased member (e.g., the tip 25 of ultrasonic transducer 23) sequentially contacts spaced obstacles (e.g., discrete pattern protuberances on the anvil cylinder 29) which are spaced sufficiently apart in the machine direction that the pressure biased member goes down to a lower elevation between adjacent obstacles, and then bumps into or onto the next obstacle: i.e., in the manner a wagon wheel bumps over a cobblestone road.

As will also be described more fully hereinafter; when the exemplary apparatus 20, FIG. 1, is operated, webs 44, 45 and 46 which are subject to being ultrasonically bonded together are forwarded onto the power-rotated anvil cylinder 29 having a circumferential velocity which is preferably from about seventy to about four-hundred meters per minute so that the webs are juxtaposed and fixedly associated with a sector of the anvil cylinder; pass through a pressure biased, ultrasonic bonding passageway between the tip 25 of ultrasonic transducer 23 and the anvil cylinder 29 where the juxtaposed webs are subjected to ultrasonic vibrational energy whereupon predetermined patterned regions of the webs become bonded regions in laminate 50. The portion of laminate 50 disposed on anvil cylinder 29 is isolated from downstream tension by means 40.

Figure 2:
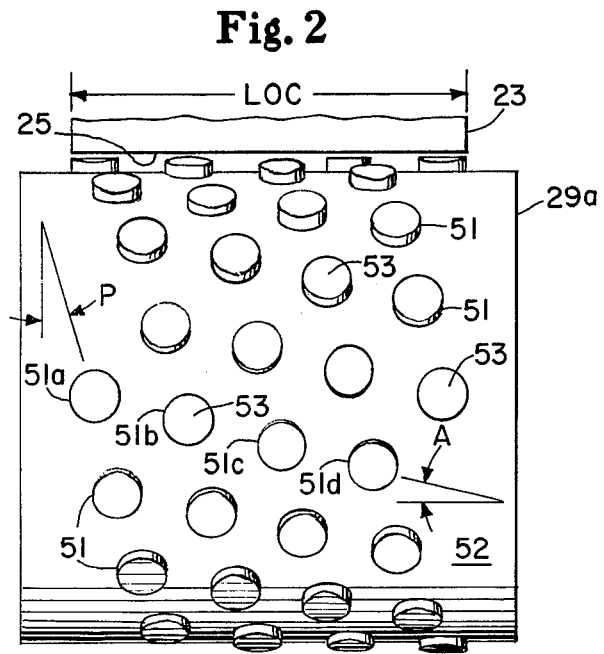
FIG. 2 is a fragmentary frontal perspective view showing the relationship between the tip of an ultrasonic transducer and an anvil cylinder of an apparatus of the general configuration shown in FIG. 1, but which anvil has a bilaterally staggered array of discrete pattern protuberances disposed thereon in a predetermined pattern which extends about the entire circumference of the anvil cylinder.

FIG. 2 is a frontal perspective view of a cylindrical anvil 29a and a fragmentary distal portion of an ultrasonic transducer 23 having its tip 25 biased towards the anvil 29a. Anvil 29a has a multiplicity of exagerated-size discrete pattern protuberances which are generically designated 51 disposed on its outwardly facing surface 52 in a predetermined pattern which extends about the entire circumference of the anvil cylinder. For this reason, apparatus comprising such an anvil cylinder would not necessarily need the camming means 37, FIG. 1, to lift the ultrasonic transducer as unpatterned sectors of the anvil cylinder passed. Hereinafter, this pattern is referred to as comprising a bilaterally staggered array of protuberances 51. This is due to the protuberances being arranged in rows which are angularly disposed with respect to the cross-machine direction (i.e., transverse surface 52) at an angle designated A; and in helical rings which are angularly pitched or skewed at an angle designated P with respect to the machine direction (i.e., circumferentially of surface 52). Hereinafter, specific protuberances are designated by a suffix letter after the number 51. For example, the four protuberances comprising one transverse row of protuberances are designated 51a, 51b, 51c, and 51d in FIG. 2. While the ultrasonic transducer 23 is shown to have a tip-width which is equal to the pattern width and designated LOC, in FIG. 2, it is not intended to thereby preclude the use of wider ultrasonic transducer tips.

Still referring to FIG. 2, the protuberances 51 are preferably truncated conical shapes which extend radially outwardly from surface 52 and which have circular distal end surfaces designated 53, although it is not intended to thereby limit the scope of the invention to protuberances of only this configuration. The anvil is finished so that all of the surfaces 53 lie in an imaginary right circular cylinder which is coaxial with respect to the axis of rotation of anvil 29a.

Figure 3:
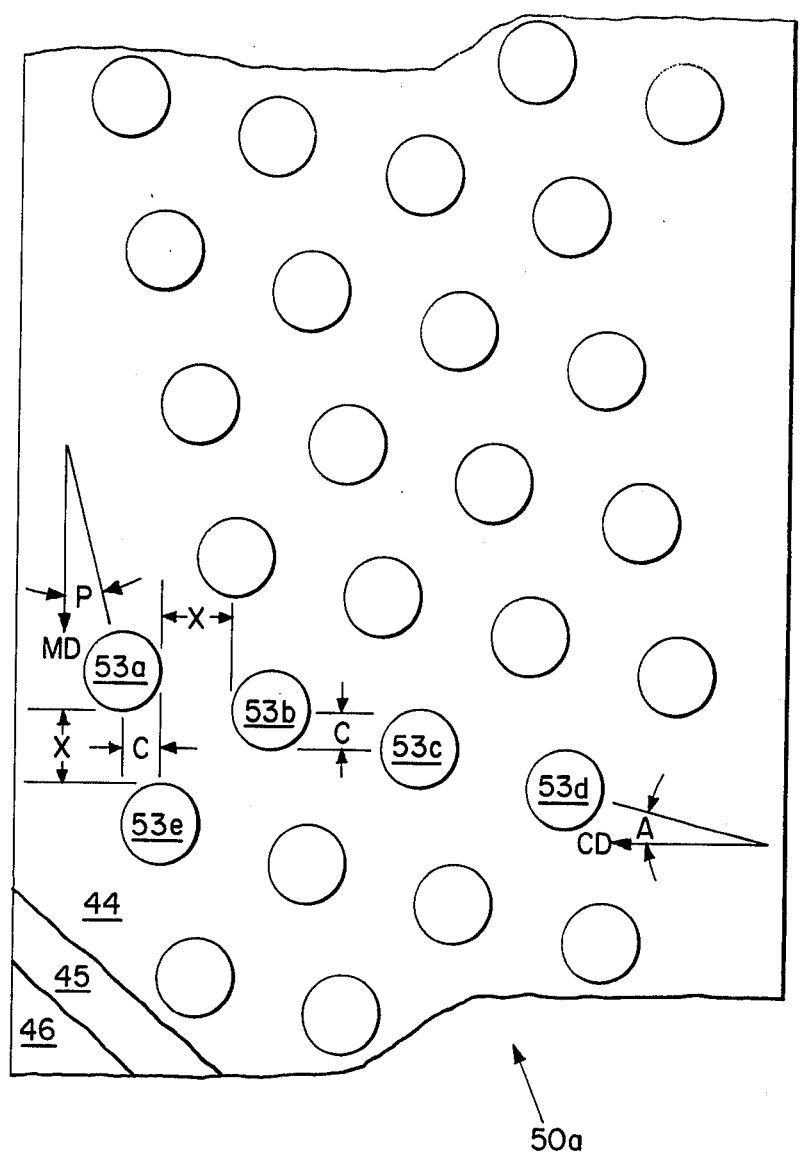
FIG. 3 is a fragmentary plan view of a laminate bearing the bonding pattern precipitated by the pattern of discrete pattern protuberances disposed on the anvil cylinder shown in FIG. 2.

FIG. 3 is a plan view of a fragmentary portion of a laminate 50a comprising laminae 44, 45 and 46; and having a pattern of bonds precipitated by anvil 29a, FIG. 2, as described above. Each bond is designated 53 with a suffix. For example, bonds 53a, 53b, 53c, and 53d were precipitated by a row of protuberances as described above, to wit, 51a, 51b, 51c, and 51d. The spatial relationships among the protuberances 51 will be inferentially described by describing the spatial relationships among the bonded regions on the laminate 50a, FIG. 3.

FIG. 3 shows that each bonded region in a transverse row of bonded regions (e.g., the row comprising bonded regions 53a, 53 b, 53c, and 53d) is spaced from the adjacent bonded regions in the same row by a distance X in the cross-machine direction, and they are offset in the machine direction by a distance C. In the exemplary pattern of FIG. 3, dimension X is equal to the diameter of a protuberance end surface 53, FIG. 2, and distance C is equal to one-half distance X. Also, the transverse rows of bonded regions are sequentially offset in the cross-machine direction by a half-diameter (i.e., distance C) and are circumferentially spaced a whole diameter (i.e., distance X) as indicated in FIG. 3. This row-to-row spacing is precipitated by the helical rings of protuberances 51, FIG. 2, described above. Thus, the surfaces 53, FIG. 2, have a continuity of circumferential overlap such that cobblestoning of the tip 25 is obviated. That is, as anvil 29a is rotated on its axis, the tip 25 of the ultrasonic transducer 23 will always be superjacent at least one surface 53 and thereby be precluded from bumping from one protuberance 51 to another. Moreover, with the protuberances 51 so configured and disposed, the tracks of the array of protuberances 51 which are precipitated by anvil rotation, overlap in the cross-machine direction across the full width LOC of tip 25. Therefore, the portion of the tip 25 which is subject to wear extends across the full width of tip 25 (i.e., across the full composite track width of the array of protuberances) and is referred to herein as the line-of-contact portion of tip 25. In this manner, the wear which is induced on tip 25 due to the passing protuberances (and the juxtaposed webs) is distributed substantially equally across the full line-of-contact portion of tip 25. By so distributing the induced wear, the frequency of having to redress tip 25 is substantially lessened. Indeed, such a skewed pattern not only distributes the wear but unobviously and unexpectedly lessens the rate of wear induced on tip 25 substantially more than such a skewed pattern would logically be expected to precipitate.

Figure 4:
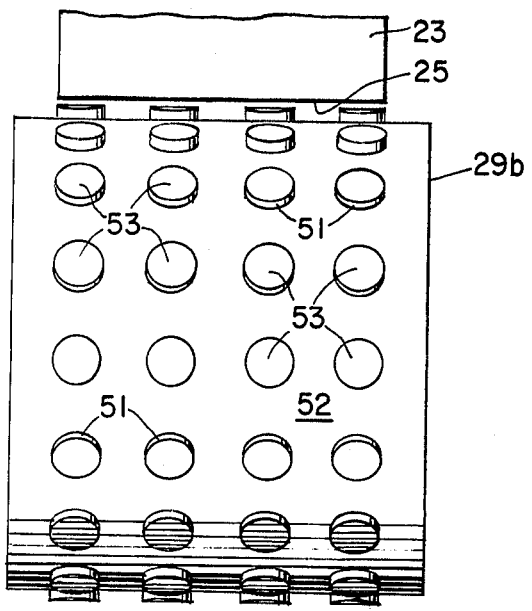
FIG. 4 is a fragmentary frontal perspective view similar to FIG. 2 but which shows an anvil cylinder having an orthogonal array of discrete pattern protuberances on its outwardly facing surface.

FIG. 4 is a frontal perspective view similar to FIG. 2 but which shows an anvil 29b having an orthogonal array of protuberances 51 disposed on its outwardly facing surface 52; and a fragmentary portion of an ultrasonic transducer 23 having its tip 25 biased towards anvil 29b. Such an orthogonal pattern of discrete protuberances is shown in FIG. 4a of U.S. Pat. No. 4,311,540 and is considered to be prior art. Such patterns precipitate undesirable grooves in the tips of their respective transducers as the transverse spaced circular rings of protuberances track across the tips. Such patterns also precipitate what has hereinbefore been described as cobblestoning of the tip of an ultrasonic transducer biased towards the protuberances as the anvil rotates. This is, the tip bounces or bumps from one transverse row of protuberances to the next albeit the laminae are disposed therebetween.

Figure 5:
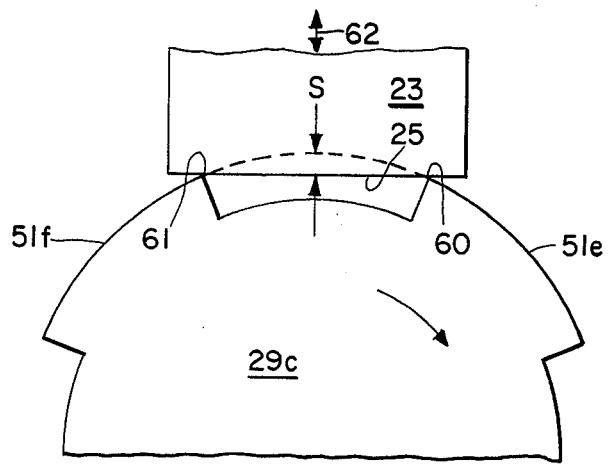
FIG. 5 is a fragmentary side elevational view of an anvil cylinder having the tip of an ultrasonic transducer in contacting relation with the leading edge of one protuberance and with the trailing edge of a second protuberance which is circumferentially spaced from the one protuberance.

FIG. 5 is a side elevational view of a fragmentary anvil cylinder 29c having an ultrasonic transducer 23 biased against protuberances 51e and 51f. These protuberances and their circumferential spacing are exaggerated to further illustrate and explain the term cobblestoning albeit the term has been defined hereinbefore. Briefly, as shown in FIG. 5, tip 25 is in contacting relation with a trailing edge 60 of protuberance 51e, and with a leading edge 61 of protuberance 51f. Thus, tip 25 has moved downwardly the distance designated S since the anvil has rotated from the position where the outwardly facing surface of protuberance 51e was supporting the ultrasonic transducer; and the ultrasonic transducer will be moved upwardly distance S as the anvil rotates to bring the face of protuberance 51f under the ultrasonic transducer. In this manner, the ultrasonic transducer will cyclically move up and down through a stroke S as indicated by the arrow designated 62 as the anvil is rotated on its axis. Such motion precipitates deliterious rammifications with respect to the anvil, the ultrasonic transducer and the materials being laminated (which materials are not shown in FIG. 5 in order to more clearly describe cobblestoning motion).

Figure 6:
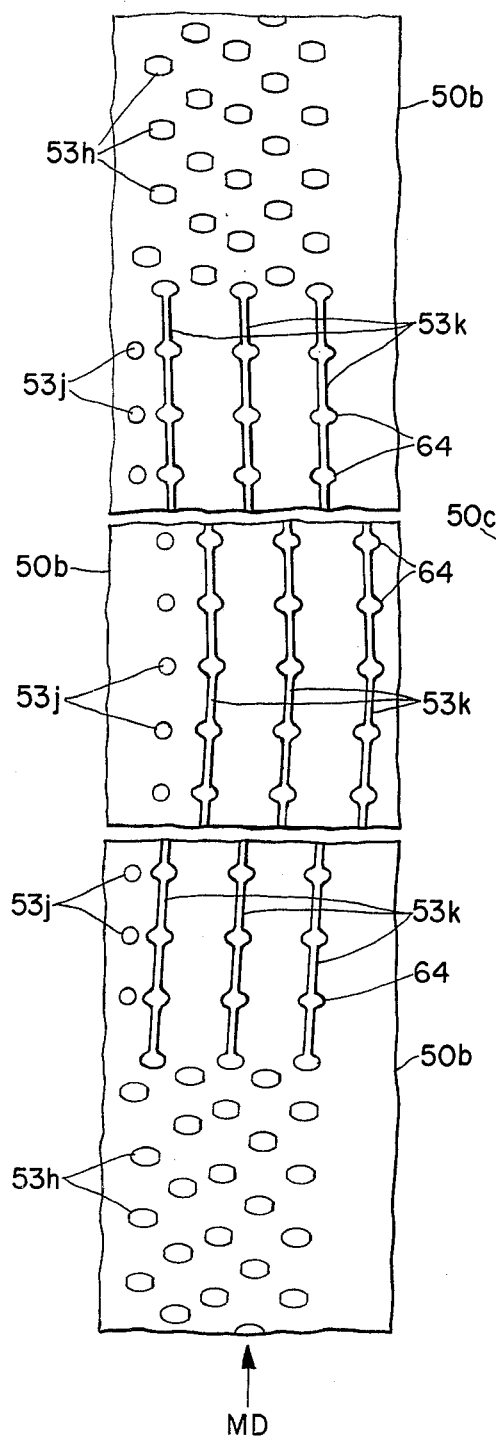
FIGS. 6 through 10 are fragmentary plan views—similar to FIG. 3—of additional laminates bearing bonding patterns precipitated by additional patterned anvil cylinders of ultrasonic bonding apparatuses embodying the present invention.

FIG. 6 is a composite plan view of three machine-direction related fragmentary portions of a laminate 50b having discrete bonded regions in accordance with the present invention. The bonded regions were precipitated by a multiplicity of discrete pattern protuberances which, in the plan view, provide bonds having barrel shapes 53h, circular shapes 53j, and elongate lines 53k having longitudinally spaced lands 64. Bonded regions 53h and 53j are disposed in arcuate, longitudinally extending arrays, and bonded regions 53k are arcuate. Also, bonded regions 53h are so spaced in the machine-direction that they have a continuity of overlap in the machine direction with each other and with the ends of the elongate bonded regions 53k. The machine direction overlap evidences that the anvil protuberances were configured and disposed to obviate cobblestoning of the ultrasonic transducer; and the arcuate arrays and shapes evidence that the anvil protuberances were configured and disposed to distribute wear across the entire active width of the tip of the ultrasonic transducer.

The three-fragment composite of FIG. 6 shows the total curvature of the arcuate arrays of bonded regions and lines albeit their radiuses are large, and their curvatures are not readily discernable from looking at any one fragment. Such patterns have been found to be very desirable for such uses as elasticized side marginal portions of disposable diapers. These and other ultrasonic bond patterns wherein barely perceptible skewing and staggering of discrete bonded regions cause little or no functional or esthetic problems enable the use of the present invention to obviate cobblestoning of the ultrasonic transducer, and greatly reduced rate of wear of the tip of the ultrasonic transducer. In one exemplary embodiment of the invention for making a product having a bond pattern of the configuration shown in FIG. 6, the elongate anvil protuberances which precipitate bonds 53k have radii of about one-hundred-thirty-two inches (about 3.35 meters) and machine direction lengths of about eleven-and-one-half inches (about 29.2 cm.); the protuberances which precipitate bonds 53h have machine direction lengths of about seventy-five-thousandths inches (about 1.9 mm) and cross-machine direction widths of about 0.1 inches (about 2.5 mm); and the anvil protuberances which precipitate the circular bonds 53j have diameters of about sixty-thousandths inches (about 1.5 mm) and are disposed in an arcuate array having a radius of about one-hundred-ninety-four inches (about 4.93 meters).

Figure 7:
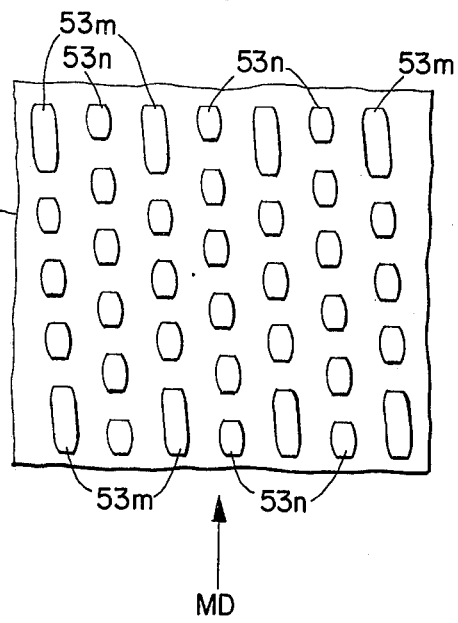

FIG. 7 is a plan view of a fragmentary portion of a laminate 50c having an ultrasonic bond pattern precipitated by an alternate embodiment of the present invention. In this embodiment, the anvil has a bilaterally staggered array of discrete pattern protuberances (i.e., which precipitate bonds 53m and 53n) which are configured and disposed to have a continuity of overlap in the machine direction to obviate cobblestoning; and are so configured and disposed transverse the anvil that wear is precipitated on the tip of the anvil across its full active width (i.e., the width of the pattern). Such a pattern as shown in FIG. 7 has a somewhat orthogonal appearance for esthetic appeal but nonetheless provides the benefits of the present invention: i.e., anti-cobblestoning; and wear distribution and rate-of-wear reduction.

Figure 8:
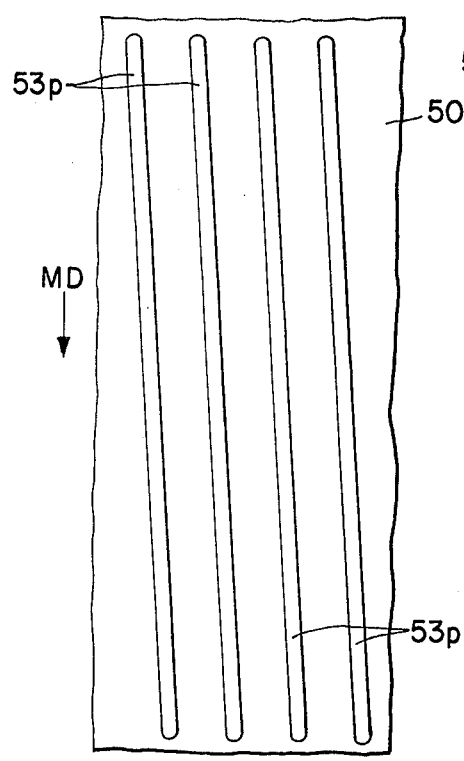
Figure 9:
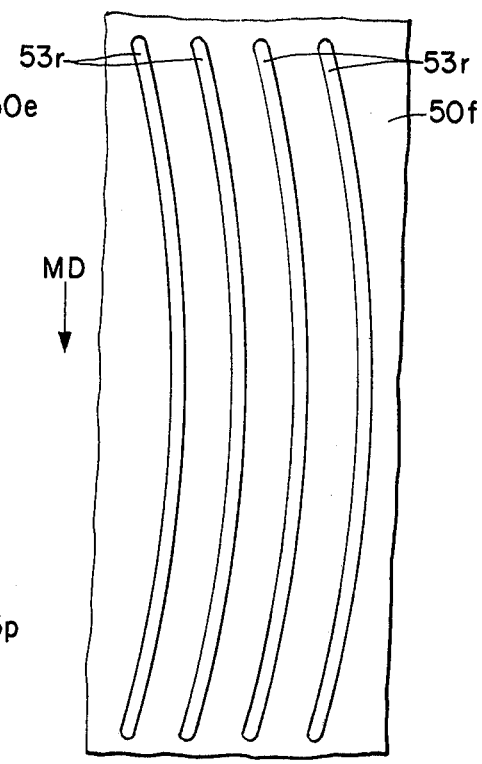
Figure 10:
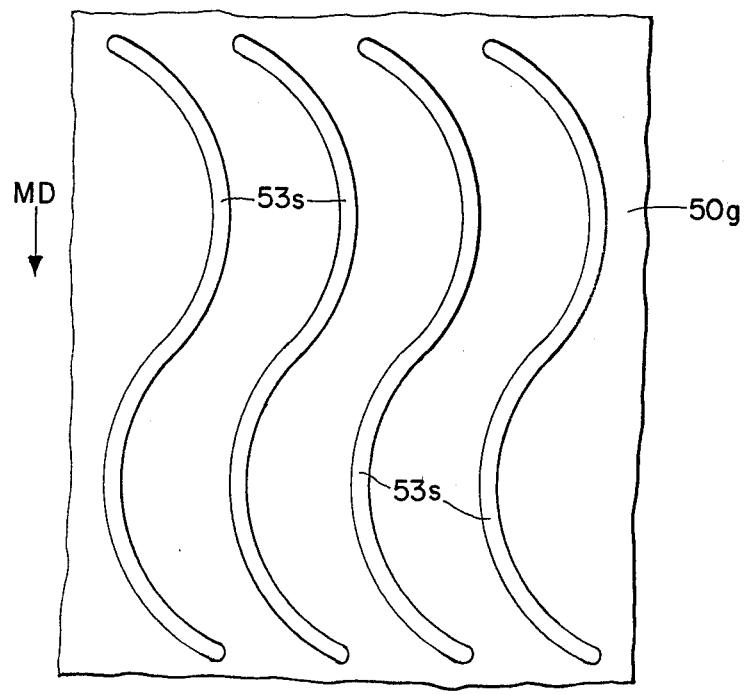

FIGS. 8, 9 and 10 are plan views of fragmentary portions of ultrasonically bonded laminates 50e, 50f, and 50g, respectively, which laminates manifest additional alternate embodiments of the present invention. The pattern of FIG. 8 comprises a plurality of transversely spaced straight discrete bar-shape-bonds 53p which are sufficiently skewed from the machine direction that the wear precipitated on the tip of the associated ultrasonic transducer is virtually evenly distributed across its full active width: i.e., the width of the pattern of bar bonds. FIG. 9 shows a pattern of arcuate-shape-bar bonds 53r wherein arcuate-shape-bar bonds 53r are so transversely spaced relative to their curvatures that the cord of each bar bond having another bar bond disposed to its left is tangent the bar bond to its left. In a similar manner, the pattern of bar bonds 53s on laminate 50g, FIG. 10, comprises S-shape bar bonds having similar cord/tangent relationships. Such relationships precipitate wear across the entire active widths of the respective ultrasonic transducers through the use of which the bond patterns were effected.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of this invention.

What is claimed is:

1. In an apparatus for effecting discontinuous patterned ultrasonic bonding of laminae which apparatus includes an anvil having a discontinuous pattern surface corporately defined by outwardly facing areas of a multiplicity of discrete pattern protuberances and which areas have a common elevation, an ultrasonic bonding transducer having a tip which is configured and disposed to contact said pattern surface along a predetermined line-of-contact, means for biasing said transducer tip towards the pattern surface, means for moving the pattern surface of the anvil relative to said transducer tip to so define a machine direction that said line-of-contact extends transverse the machine direction and so that pattern bonding of the laminae is effected as the laminae are forwarded in the machine direction while fixedly associated with the discontinuous pattern surface, the improvement wherein said discrete pattern protuberances are so configured and disposed in said machine direction that cobblestoning of said transducer tip relative to the pattern surface is obviated and so that every imaginary line which extends transverse said anvil at the common elevation of said outwardly facing areas touches some portion of said discontinuous pattern surface.

2. The apparatus of claim 1 wherein said discrete pattern protuberances are so configured and disposed in said machine direction that said outwardly facing areas have a continuity of overlap in said machine direction.

3. The apparatus of claim 1 wherein said discrete pattern protuberances are also so configured and disposed transverse said anvil that their machine-direction-tracks cyclically sweep the entirety of the line-of-contact portion of said transducer tip.

4. The apparatus of claim 3 wherein said discrete pattern protuberances are so configured and disposed transverse said anvil that wear of said transducer tip is substantially evenly distributed along the entire line-of-contact portion thereof.

5. In an apparatus for effecting discontinuous patterned ultrasonic bonding of laminae which apparatus includes an anvil having a discontinuous pattern surface corporately defined by outwardly facing areas of a multiplicity of discrete pattern protuberances and which areas have a common elevation, an ultrasonic bonding transducer having a tip which is configured and disposed to contact said pattern surface along a predetermined line-of-contact, means for biasing said transducer tip towards the pattern surface, means for moving the patterned surface of the anvil relative to said transducer tip to so define a machine direction that said line-of-contact extends transverse the machine direction and pattern bonding of the laminae is effected as the laminae are forwarded in the machine direction while fixedly associated with the discontinuous pattern surface, the improvement wherein said discrete pattern protuberances are so configured that none of said areas has a cross machine dimension as great as the cross machine dimension of said discontinuous pattern surface and so that all of said areas are so disposed transverse said anvil that their machine-direction-tracks cyclically sweep the entirety of the line-of-contact portion of said transducer tip.

6. The apparatus of claim 5 wherein said discrete pattern elements are so configured and disposed transverse said anvil that wear of said transducer tip is substantially evenly distributed along the entire line-of-contact portion thereof.

7. The apparatus of claim 1, 2, 3, 4, 5 or 6 wherein said anvil is a cylinder which is rotatably mounted on an axis of rotation so that said machine direction extends circumferentially about said anvil, and so that said transverse direction extends parallel to said axis of rotation, and all of said outwardly facing areas lie in the surface of an imaginary right circular cylinder having its axis coextensive with said axis of rotation.

* * * * *